G. POLLARD.
SPEED CHANGING, REVERSING, AND BRAKING GEARING.
APPLICATION FILED JAN. 6, 1919.
1,333,729.
Patented Mar. 16, 1920.
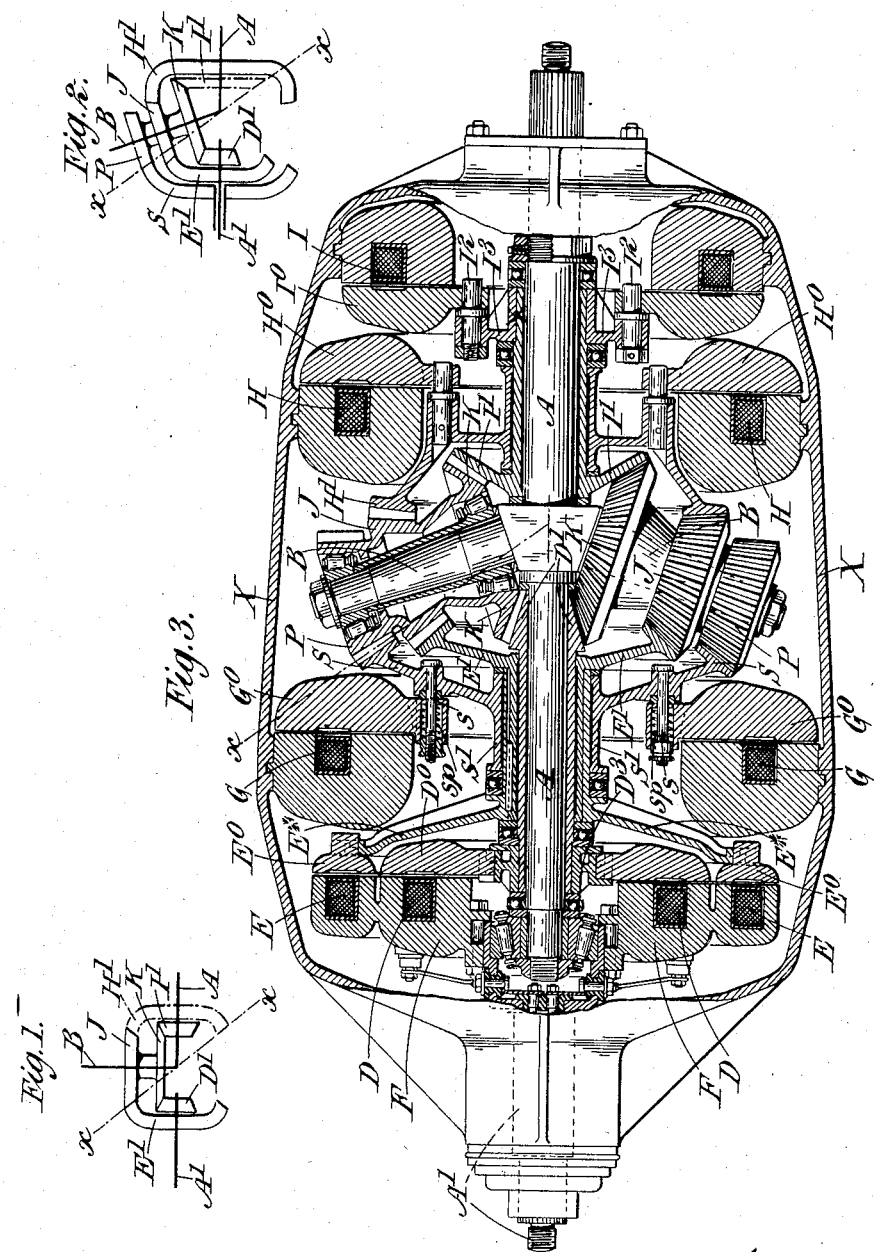

UNITED STATES PATENT OFFICE.

GEORGE POLLARD, OF PICCADILLY, WESTMINSTER, ENGLAND, ASSIGNOR TO THE MENCO-ELMA SYNDICATE LIMITED, OF WALBROOK, LONDON, ENGLAND.

SPEED-CHANGING, REVERSING, AND BRAKING GEARING.

1,333,729.     Specification of Letters Patent.     Patented Mar. 16, 1920.

Application filed January 6, 1919. Serial No. 269,795.

*To all whom it may concern:*

Be it known that I, GEORGE POLLARD, a subject of the King of England, residing at Piccadilly, in the city of Westminster, England, have invented an Improved Speed-Changing, Reversing, and Braking Gearing, of which the following is a specification.

This invention relates to an improved speed-changing, reversing and braking gear more especially intended for motor road-vehicles. In the amended specification of British Letters Patent No. 1853* of 1912 granted to George Louis Aurele Perret, in the specification of British Letters Patent No. 9557/1914 granted to G. W. Johnson, and also in the specifications of British Letters Patent No. 110020 (14117/1916) and No. 11712/1917 granted to George Pollard and The Menco-Elma Syndicate Limited a class of electro-mechanical epicyclic bevel-wheel speed-changing and reversing (and in some cases braking) gearing is described which gives various forward speeds and a reverse and is especially intended for motor road-vehicles.

Figures 2 and 3 of the accompanying drawings illustrate diagrammatically gearing of this kind. It contains as its leading characteristics a driving shaft $A^1$, a single driven shaft A, the latter connected for example to the road-wheels, a planetary shaft B (which may, for instance, be at right angles to the driven shaft or inclined thereto) fixed to the driven shaft so as to rotate therewith, the planetary shaft and the single driven shaft constituting the only way of taking power out of the gear, sun-gears $D^1$ $E^1$ $H^1$ $I^1$ (or either of said $H^1$ and $I^1$) loose and turning about the same axis as the said driving and driven shafts, and also planet gears J, K loose on said planet shaft attached or geared to one another and engaging the sun-gears, and electro-magnetic clutches and brakes (not shown in Fig. 1) by means of which variations of speed and a reverse can all be obtained within certain limits. All the wheels of these constructions of epicyclic gearing are always in mesh. The limits aforesaid arise because the two planet-wheels J, K which have been employed to reverse the driven shaft (*i. e.* to make it rotate in the opposite sense to that of the rotation of the driving shaft) are two which are actively employed also in the various forward drives. The velocity-ratio of the reverse-gear (established by stopping $E^1$ and driving J and K by $D^1$) is inseparably bound up with the ratios of the various forward drives because though a skilful compromise may have been made in proportioning all the ratios, there remains the fact that no other planet-wheels are available in the reverse than those (J and K) utilized in forward drives also.

It is the object of the present invention that without increase in the number of the electro-magnets or their contact-switches, or alteration in the order in which the magnets and switches are used, means shall be provided whereby in epicyclic gearing of the class above referred to a desirable velocity-ratio of reverse shall nevertheless be obtainable without placing the designer under such limitations as are above alluded to, thus leaving him free to settle, independently of the desired ratio of reverse, desirable ratios for the forward speeds, and to thereafter select a suitable ratio for the reverse which he may choose freely within limits much wider than those within which he was heretofore confined.

According to the present invention there is employed for the reversal a supplemental planet-gear loose on the planetary shaft and attached or geared to the other loose planet-gears thereon but unlike them in that it is employed solely for obtaining the reverse and is geared to a supplemental sun-wheel, that is to say, a sun-wheel (with which it is always in mesh) not employed to give any of the forward speeds but used, like the supplemental planet, solely for reversal.

In the accompanying drawings,

Fig. 1 is a diagrammatic representation of a previously-known form of electro-mechanical epicyclic bevel-wheel speed-changing, reversing and braking gearing, having three sun-wheels as shown in full lines, or four when the chain-lined wheel is present;

Fig. 2 is a diagrammatic representation of a gear similar to that illustrated in Fig. 1, but modified according to the present invention by the inclusion of the combination of a supplemental sun-wheel S and supplemental planet-wheel P, for reversal, above and hereinafter referred to; and Fig. 3 is a longitudinal central section in greater detail than that of Fig. 2 of a similar modified gear constructed in accordance with this invention, giving five forward speeds and a reverse and braking.

In these drawings, the gear comprises a driven part A and arms or planetary shafts B fixed to it, only one of the arms B being shown in Figs. 1 and 2, the arms intersecting the shaft. The arms B in the example illustrated in Figs. 2 and 3 are tilted toward the fly-wheel F. The arms or planetary shafts B receive motion from the motor, which motor, not shown in the drawings, actuates the driving shaft $A^1$ carrying the fly-wheel F in Fig. 3 and the arms B transmit this motion to the driven shaft A at the various forward speeds, and also in the reverse; the shaft A may control the road-wheels of a motor vehicle.

In order to obtain the five speeds in forward running (including the direct drive) and the braking of the vehicle a system of magnetic clutches and magnetic brakes is employed, this system comprising the magnetic clutches D and E in connection with the fly-wheel F and therefore rotating at the speed of the motor. It also comprises the magnetic brakes H and I secured to the casing X containing the mechanism so that the sun-wheels $H^1$ $I^1$ can when required be held against rotation. The magnetic clutches are supplied with current through any suitable rubbing contacts, while the magnetic brakes are supplied with current through suitable conductors. The said clutches and brakes operate by magnetic attraction their corresponding rings or disks $D^0$ $E^0$ $H^0$ $I^0$ which are connected by sliding non-rotating connections of any suitable type with the bevel sun-wheels $D^1$ $E^1$ $H^1$ $I^1$, which wheels are concentric with the shaft A, and are always in engagement with the planetary wheels J and K, which latter are integral with each other, or fixed together, and are rotatably mounted on the inclined planetary arms B (but might not be integral with one another but geared together to rotate in the same sense about the planetary shafts or arms B).

The disk $I^0$ slides on pins such as $I^2$ which are carried on the ring $I^3$, the latter being fixed on the long hub of the wheel $I^1$. Thus the disk $I^0$ engages the toothed-wheel $I^1$ so that there is no relative rotary motion between them. The disk $H^0$ is similarly in sliding but non-rotating engagement with the sun-wheel $H^1$ which has a long hub rotating freely on the outside of the long hub of the sun-wheel $I^1$. The disk $D^0$ is in sliding non-rotary engagement with the toothed-wheel $D^1$ through the disk $D^3$ fixed on the sleeve which forms a long hub for the wheel $D^1$. The ring $E^0$ is in sliding non-rotary engagement with the disk $E^*$ fixed to the long hub of the sun-wheel $E^1$, this long hub rotating freely upon the outside of the long hub of the sun-wheel $D^1$. It is to be understood that the detail and design of the electro-magnetic clutches and brakes is not of the present invention.

By the employment of the wheels $D^1$, $E^1$, $H^1$, $I^1$, J, K to operate the arms B and thereby the single driven shaft A forward speeds and braking may be obtained in a manner which may be considered as well-known and is not herein described, seeing that it is explained in the specifications of the earlier Letters Patent hereinbefore referred to. What is important for the purposes of the present invention is that an electro-magnetic brake G fixed to the casing X and employed in the apparatus of the earlier inventions to control the operation of the sun-wheel $E^1$ is not employed for that purpose in the present invention. According to the present invention instead of employing the wheels $E^1$, J conjointly with $D^1$, K for the purpose of obtaining the reverse, the wheels S and P are used. The wheel S is the supplemental sun-wheel hereinbefore referred to. It turns freely by means of its long hub $S^1$ on the outside of the long hub of the wheel $E^1$ and carries the disk or armature $G^0$ which can slide along pins $s$ on the wheel S toward and away from the clutch G under the control of that clutch and of springs $sp$ coiled around the pins $s$. P is a supplemental planet-wheel which, in the example illustrated in Fig. 3, is integral with the other planet-wheels $J^1$, $H^1$ and like them is loose on the planetary shaft B. When it is desired that the reversal should actually occur, this supplemental sun-wheel S has to be locked to the casing or otherwise temporarily fixed; at other times the supplemental sun-wheel S is rotated idly by the supplemental planet-wheel P; the latter is likewise an idler, except in actual reversal. In order that the supplemental sun-wheel S and the supplemental planet-wheel P may be able to effect reversal, it is necessary as in the gears of the earlier patents aforesaid, that the sun-wheel which is checked or locked to bring about reversal (the supplemental sun-wheel in the present invention) should form with its meshing planet-wheel (the supplemental planet-wheel in the present invention) a gearing of higher ratio than that of the companion sun-wheel and planet-wheel ($D^1$ and K) which latter sun-wheel in reversal is given the same angular velocity as the driving shaft $A^1$, in relation to which it is made non-rotatable when reversal is to occur. It is also necessary that the checked or locked sun-wheel S should be at the same side of the planet-wheels as that at which the companion sun-wheel $D^1$ is situated; this is in order that the virtual axis $x$—$x$ of these two planet-wheels P and K shall, during reversal, be between the pitch cone surface of the said companion sun-wheel K and the planetary shaft.

When reversal is required, the supplemental sun-wheel S is locked to the casing by the electro-magnetic brake G, and the sun-wheel $D^1$ is locked to the fly-wheel and consequently to the driving shaft by the clutch D. The wheel $D^1$ then runs at the speed of the shaft $A^1$, while the wheel S is rendered stationary. The planet-wheels K and P driven by the pinion $D^1$ are constrained to rotate on the planetary shaft B and to turn at the same time about an instantaneous axis $x$—$x$, and in this movement they react on the supplemental sun-wheel S which is stationary, and then take around the arms B and consequently the shaft A in a direction opposite to that of the rotation of the driving shaft $A^1$.

A reverse is also obtainable, if desired, by coupling the sun-wheel $E^1$ to the driving shaft $A^1$ by the clutch E, $E^0$, and utilizing the supplemental sun-wheel S and planet-wheel P by locking S as before.

What I claim as my invention and desire to secure by Letters Patent is:—

In an electro-mechanical epicyclic bevel-wheel speed-changing and reversing gearing wherein a single driven shaft and a planetary shaft fixed to it at an angle constitute together the only way of taking power out of the gear at different forward speeds and in reversal, the provision of a reversing-device comprising a supplemental sun-wheel (for example S) in combination with a supplemental planet-wheel (for example P) the latter rotating about its own axis with the other planet-wheels that like it are loose on the planetary shaft and the said combination being used so that it shall operate idly during forward drives whereby it can be proportioned as to its gear ratio with much greater freedom than if it had as heretofore to take part in turning the driven shaft forwardly.

In testimony whereof I have signed my name to this specification in the presence of two subscribing witnesses.

GEORGE POLLARD.

Witnesses:
WM. JOHN WEEKS,
W. R. YEADELL.